Aug. 12, 1952   H. J. KANAWYER ET AL   2,606,488
VINEYARD CULTIVATOR
Filed May 20, 1949   2 SHEETS—SHEET 1
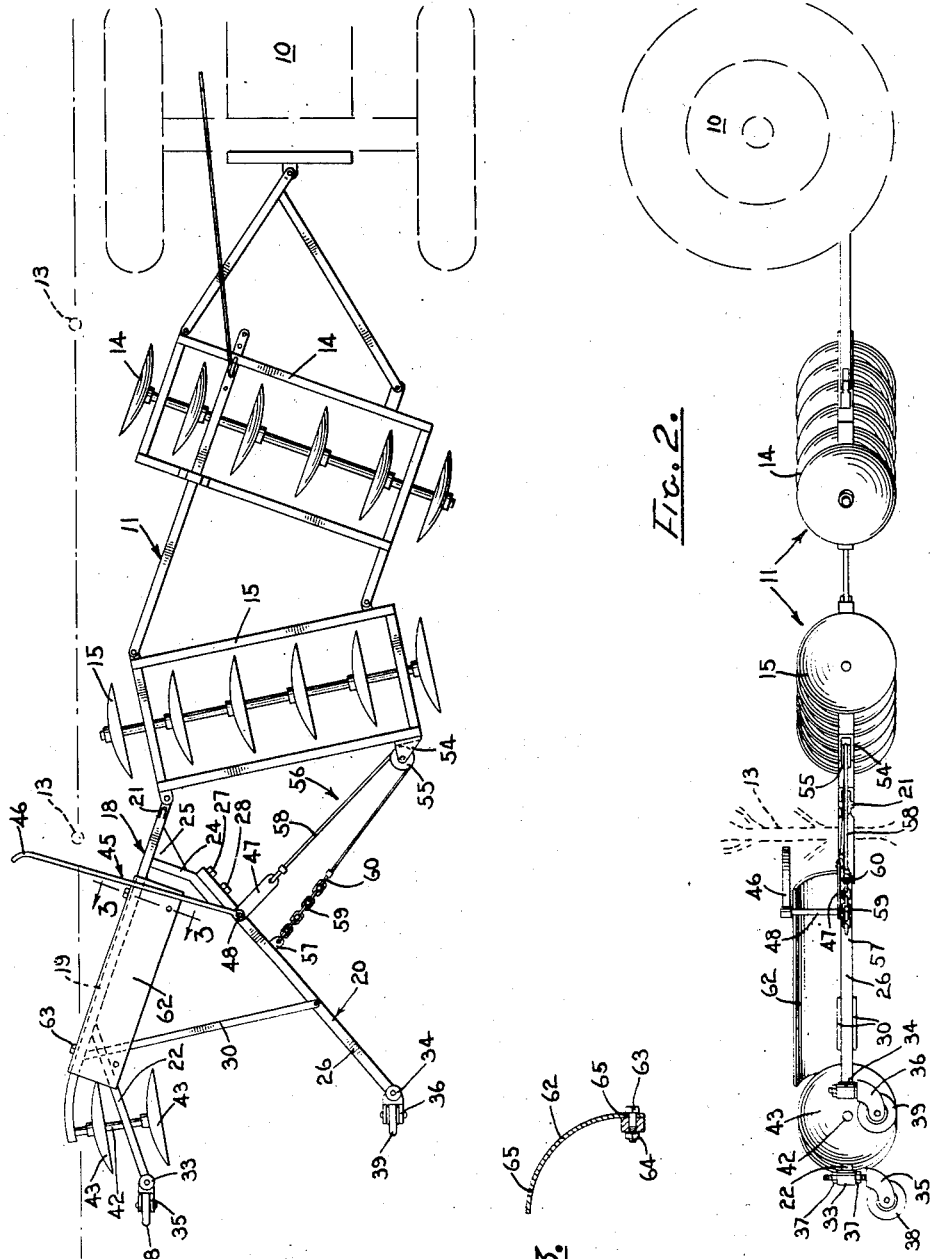
INVENTORS
HAROLD J. KANAWYER
EARL F. HULTQUIST
BY
ATTORNEYS.

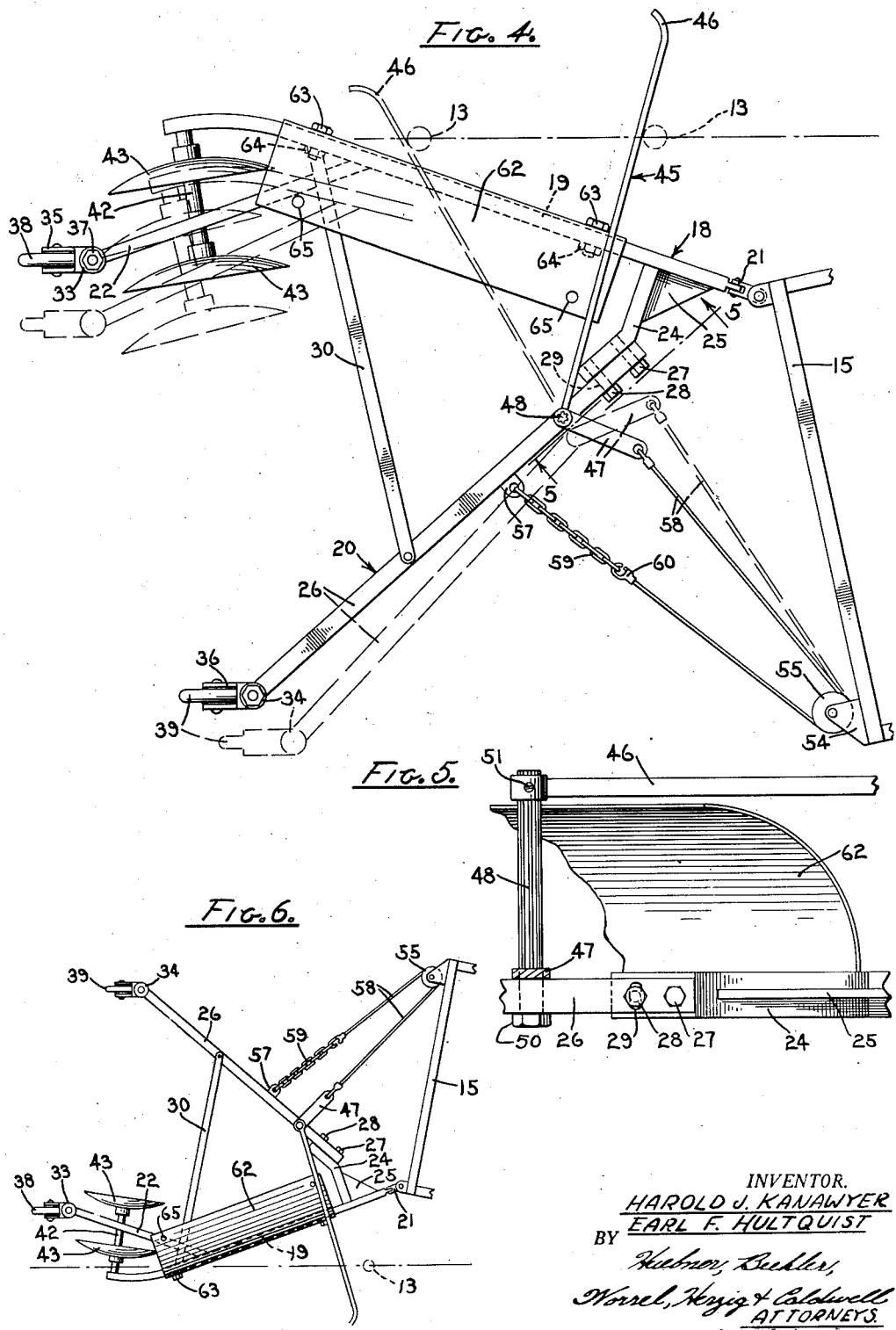

Patented Aug. 12, 1952

2,606,488

UNITED STATES PATENT OFFICE 2,606,488

VINEYARD CULTIVATOR

Harold J. Kanawyer, Reedley, and Earl F. Hultquist, Dinuba, Calif.

Application May 20, 1949, Serial No. 94,292

5 Claims. (Cl. 97—137)

The present invention relates to vineyard cultivators and more particularly to cultivators adapted to work the earth in close proximity to, and from between, spaced obstructions arranged in rows.

It is the general practice in viticulture to work the earth in as wide a swath as possible between rows of grapevines, berry vines and the like and subsequently by hand controlled operations to cultivate the earth adjacent and between the vines of each row. This latter cultivating is usually effected by means of a single plow, generally known as a French plow, which is drawn in a line of draft closely adjacent to a row and manually manipulated to cause the same to track between the vines of the row and manually dragged from the row as each vine is approached. This is an exceedingly fatiguing operation and one that frequently results in the destruction of vines by the snagging thereof by the plow. The control of French plows is so difficult as to make it impractical to approach each vine closely enough to remove weeds and debris immediately adjacent thereto. It is usually necessary to hand-hoe the weeds after the French plow operation has been completed.

Various improvements over the French plow described above have been effected. These may be grouped into implements that are manually controlled and those that are automatic in operation. The former are generally subject to the difficulties described above, albeit in many instances to a lesser extent, and the latter to damaging of the vines incident to contact therewith, expense and complexity in construction, an inability to adapt to varying operational conditions, and to clogging necessitating frequent attention. These and other disadvantages of vineyard cultivators now available for the purpose, are overcome by the device of the present invention.

An object of the present invention is to provide an improved implement adapted to remove weeds and debris from close proximity to, and from between, spaced obstructions arranged in rows.

Another object is to provide an automatic implement for the cultivation of earth closely adjacent and between plants growing in spaced arrangement in rows which is automatically traveled inwardly and outwardly between the plants in response to plant engagement when the implement is drawn along a side of the row in immediate relation thereto.

Another object is to provide an implement of the character described that automatically assumes a level, sloped, and/or tilted attitude in response, and corresponding, to terrain over which it is drawn.

Another object is to provide an implement for the stated purposes that is self-cleaning, obviating clogging thereof by encountered weeds and debris.

Another object is to provide a cultivator suited to the described viticulture operations that is self-sharpened.

Another object is to provide an implement adapted for working the earth between and adjacent plants arranged in rows that is guided by plant engagement without harm even to small cultivated plants or supporting stakes therefor.

Another object is to provide a device of the character described that is conveniently dismantled, inverted and reassembled, permitting expeditious adaption thereof for the working of earth at either side of a line of draft.

Another object is to provide in an implement laterally reciprocated during forward movement by contact of a guide arm with obstructions, a control system adapted automatically to retract the device from a laterally extended position giving the guide arm a mechanical advantage over the implement when first initiating retraction in response to obstructive contact and progressively less mechanical advantage as the retractive movement is continued.

A further object of the invention is to provide a control system in a device of the character described imparting to a guide arm a mechanical advantage varying in the nature of a sine wave, that is at a maximum when the implement is laterally extended so that retraction may be initiated by a minimum pressure on the arm.

Still further objects and advantages will become apparent in the subsequent description in the specification wherein:

Fig. 1 is a plan view of the device of the present invention showing a combined disc harrow and vineyard cultivator in towed relation to a draft appliance.

Fig. 2 is a side elevation of the structures shown in Fig. 1.

Fig. 3 is a section taken on line 3—3 in Fig. 1.

Fig. 4 is a somewhat enlarged plan view of the vineyard cultivator.

Fig. 5 is a section taken on line 5—5 of Fig. 4.

Fig. 6 shows the vineyard cultivator in inverted position as modified for the working of a row of vines opposite to that shown in Fig. 4.

Referring in greater detail to the drawings:

In Figs. 1 and 2 a draft appliance is fragmentarily illustrated at 10, in towing relation to a gang disc harrow 11, and the vineyard cultivator of the present invention indicated in following relation thereto. It will be apparent that the vineyard cultivator may be drawn by any suitable draft appliance providing laterally spaced positions for connection purposes. Inasmuch as it is desirable to work the earth in as wide a swath as convenient between the rows of vines, one of which is illustrated at 13, the disc harrow is excellently suited to the purpose. Disc harrows of various types are suitable to the purpose and the illustrative harrow shown thus is not described in great detail. Suffice it to say that the harrow preferably employs a pair of angularly related gangs 14 and 15 of disc harrow blades. The gangs are generally transversely disposed to the normal direction of movement and the rearward gang 15 usually employed so that the side thereof, more closely adjacent the row of vines being worked, lags the opposite end of said gang.

The vineyard cultivator comprises a substantially horizontal A frame 18 arranged in following relation to the disc harrow 11, having the apex thereof connected to the harrow and having a pair of divergent legs 19 and 20 rearwardly extended from the apex. Because of advantages subsequent to become apparent, connection of the A frame 18 to the disc harrow is preferably effected by means of a swivel connection 21 mounted on the apex of the A frame 18 and connected to the lagging end portion of the rear gang 15 of the disc harrow. Leg 19 extends rearwardly and slightly toward the adjacent row of vines 13 when in operable position. Near the rearward end portion of the leg 19, an auxiliary leg 22 is extended rearwardly and inwardly therefrom.

The leg 20 includes a forward end portion 24 weldably secured to the leg 19 in substantially horizontal and right angular relation thereto. Rigidity of the mounting of the forward end portion of said leg is accomplished by a gusset plate 25 interconnecting the forward portion and the leg 19. A rearward portion 26 of the leg 20 is articulately connected to the forward portion as shown in Figs. 4 and 5. The rearward portion is pivotally connected to the forward portion by means of a pivot pin 27 inserted through overlapped ends of said portions and the portions secured in predetermined relation by means of an adjustment bolt and nut 28 extended through the forward portion and through a kidney slot 29 formed in the rearward portion. It is apparent that the rearward portion may be constrained to the plane of the forward portion, or angled upwardly or downwardly therefrom by adjustment of the articulated connection described.

The legs 19 and 20 are preferably interconnected in fixed spaced relation by a strut 30 weldably secured to the legs, bolted thereto, or secured in any other dependable manner. A pair of sleeves 33 and 34 are mounted on the rearwardly extended end portions of the leg 22 and of the auxiliary leg 20, respectively, in substantially erect positions. Yokes 35 and 36 are journaled in the sleeves 33 and 34 for swivel movement and secured by lock nuts 37 above and below the sleeves. The portions of the yokes received by the sleeves are preferably longer than the sleeves so that the yokes may be positioned longitudinally of their respective sleeves by adjustable positioning of the nuts 37 to achieve elevational control of the rearward end portions of their respective legs. Swivel wheels 38 and 39 are journaled in the yokes. So mounted the swivel wheels provide two point support for the rearward end portion of the frame which in cooperation with the support provided by the swivel connection 21 imparts three point support to the A frame 18 automatically accommodating the same to sloped, tilted, or level attitude corresponding to terrain traversed. The frame may be inverted for operation by inverting the yokes 35 and 36 in their sleeves 33 and 34, disconnecting the swivel connection, and be effecting reconnection of the frame to the rear gang in upside down position. The frame is inverted for use on rows of vines on the opposite side of a line of draft to that shown in Figs. 1 and 4, as is evident in Fig. 6.

An axle 42 is mounted in the rearward end portions of the leg 19 and the auxiliary leg 22 transversely disposed to the frame. A pair of concavo-convex disc harrow blades 43 are mounted on the axle for rotation in earth engagement. The axis of rotation of the blades is preferably conformed to the plane of the A frame 18 so that the disc harrow blades may effectively engage the earth when the frame is upright as well as in inverted position. As shown in Figs. 1, 4, and 6 the disc harrow blades are preferably inwardly disposed the leg 19 so that said leg may fend the cultivator from obstructions encountered.

A substantially L-shaped guide arm 45 is pivotally mounted in the A frame 18 and has a leg 46 laterally extended to the side of the frame on which the disc blades are mounted and a leg 47 forwardly extended therefrom and laterally toward the leading end portion of the gang 15. The pivotal mounting of the guide arm is shown in Fig. 5 consisting of a splined shaft 48 journaled in the rearward portion 26 of the leg 20 of the A frame 18 in a substantially erect position and having the leg 47 mounted on the shaft above and in abutting relation to the A frame 18 and a securing nut 50 screw threadedly engaged to the shaft below the frame. It will be apparent that by removal of the securing nut 50 the shaft may be inverted in the frame pursuant to inverting of the cultivator. The leg 46 of the guide arm is mounted on the splined shaft upwardly spaced from the leg 47 so as to clear a hood or shield, presently more fully described, for the disc harrow blades 43 and the legs of said guide arm secured on the shaft in said relation, as by set screws 51. Each leg of the guide arm is provided with an opening complementary to the cross sectional configuration of the splined shaft and slideably fitted thereon. The splined association of the legs of the guide arm on the shaft permits adjustment of the angular relationship of said portions of the guide arm and the dependable maintenance thereof in predetermined position.

A bracket 54 is mounted on the rear gang 15 of the disc harrow 11 near the leading end thereof and rearwardly extended. A sheave 55 is journaled in the bracket for rotation about a substantially erect axis. A flexible tension member 56 is interconnected the forward end portion of the leg 47 of the guide arm 45, threaded through the sheave, and returned and secured, as at 57, to a point on the A frame 18 preferably rearwardly of the pivotal mounting of the guide arm. The flexible tension member conveniently takes the form of a cable 58 threaded through the sheave, connected to the guide arm, and connected, on the opposite side of the sheave, to a chain 59. The cable is provided with a catch 60 for engagement with the chain whereby the operable link of the tension member is conveniently predetermined by selective engagement of the catch with links of the chain.

To fend off vine runners and the like, the arcuate shield 62 is mounted on the leg 19, as by bolts 63 inserted through the hood and said leg and tightened into place by nuts 64. As shown in Fig. 3, the shield is extended upwardly and over the leg 19 of the frame and lifts encountered vine runners over the disc harrow blades 42. It will be apparent that upon inverting the cultivator the hood is removed and mounted in inverted position, as shown in Fig. 6. For this purpose alternate openings 65, as shown in Fig. 3 are formed in the hood.

Operation

The operation of the device of the present invention is clearly apparent and briefly summarized at this point. Forward movement is imparted to the cultivator in a line of travel closely adjacent the row of vines 13. When a vine, stake, or other obstruction in the row is encountered, the leg 46 of the guide arm is dragged rearwardly, as shown in Fig. 4, pivoting the leg 47 of said guide arm from alignment with the flexible tension member, pulling said flexible tension member through the sheave 50, and forceably pivoting the A frame 18 away from the row of vines through pull exerted thereon by means of the chain 59. The swivel wheels provide elevational support for the rearward end portion of the frame during all operations thus facilitate lateral reciprocation of the frame. It will be apparent that a slight force exerted on the leg 46 of the guide arm will initiate retraction of the cultivator from between the vines because of the ease with which the leg 47 is urged from alignment with the cable 58. Further, the farther the guide arm is moved in a counterclockwise direction, as viewed in Figs. 1 and 4, the greater is the speed of retraction of the A frame 18 in response to a given angular movement of the guide arm.

As shown in Figs. 1 and 4, the disc blades 43 are angled inwardly toward the vines for cutting purposes and present their convex side toward the vines. This angling draws the cultivator back between vines in the row as soon as the leg 46 of the guide arm disengages an encountered obstruction. This lateral movement of the cultivator to positions between the vines pulls the flexible tension member 56 back through the sheave and returns the leg 46 of the guide arm to the original position, preconditioned for obstructive contact.

As previously stated, conventional vineyard cultivators have been unable to adapt themselves to uneven terrain traversed and thus vary greatly in their earthworking results. The three point support of the A frame 18 of the present invention conforms the cultivator in attitude to the surface of the earth traversed so that at all times the disc blades 43 bear the predetermined cutting attitude. The yoke 35 is adjustable longitudinally of its respective sleeve 33 by means of positioning of the nuts 37 longitudinally thereof. This provides accurate depth control of the adjacent disc harrow blades 43. Adjustment of the articulated connection of the rearward and forward end portions of the leg 20 of the A frame 18 and of the yoke 36 in the sleeve serves to tip the leg 19 and the disc harrow blades as desired.

The cultivator of the present invention is conveniently adapted to varied operational requirements and dependably maintained in such adjustment. The operation is positive and effective, and buffeting of the vines and stakes encountered by the guide arm is minimized by the ease of initiating retractive movement. The cultivator may be conveniently and easily inverted for operation at the opposite side of a draft appliance. The rotary movement of the disc harrow blades maintains the same in sharpened condition and obviates clogging.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. A cultivator adapted for connection to a draft appliance comprising a frame in following relation to the draft appliance and having forward and rearward end portions, means swivelly connecting the forward end portion of the frame to the draft appliance, laterally spaced support wheels invertibly mounted in the frame whereby the frame may be supported on the wheels in normal or inverted positions, a disc harrow blade rotatably mounted in earth engagement by the rearward end portion of the frame and at a side thereof, said disc harrow blade having an axis of rotation in the plane of the frame, a guide arm pivotally mounted by the frame and laterally extended from the frame to the side thereof on which the disc harrow blade is mounted forward of said blade, a sheave mounted on the draft appliance laterally spaced from the swivel connection of the frame to the appliance, and a flexible tension member passed through the sheave and connected to the guide arm and the frame on opposite sides of the sheave.

2. A cultivator adapted for connection to a draft appliance comprising a forwardly movable draft frame, means for swivelly connecting the forward end portion of the frame to a draft appliance, laterally spaced support wheels in supporting relation to the rearward end portion of the frame, an earthworking tool mounted in the rearward end portion of the frame and at a side thereof, a guide arm pivotally mounted in the frame for reciprocal positioning between a laterally extended attitude directed to the side of the frame on which the earthworking tool is mounted and a position rearwardly angled therefrom, a sheave adapted for connection to the draft appliance in laterally spaced relation to the swivel connection to the side thereof opposite that to which the guide arm is extended, and a flexible tension member passed through the sheave and having opposite ends connected to the guide arm and the frame at a position rearward of the guide arm.

3. A cultivator adapted for connection to a draft appliance in following relation thereto comprising a substantially horizontal A frame, means for effecting swivel connection of the apex of the A frame to the draft appliance at a side of said appliance, said A frame having rearwardly extended and divergent legs, swivel wheels in supporting relation to the rearwardly extended end portions of the legs of the A frame, an earthworking tool mounted by the leg of the A frame at the side of said frame corresponding to the side of the draft appliance to which said frame is connected, an L-shaped guide arm mounted in the frame for pivotal movement about a substantially erect axis and having a leg laterally extended from the frame to the side thereof on which the earthworking tool is mounted and having a second leg directed forwardly toward a position on the draft appliance laterally spaced from the swivel connection of the frame at the side of the appliance opposite said swivel connection, a sheave mounted on the draft appliance in substantial alignment with the second leg of the guide arm, a flexible tension member connected to said second leg of the guide arm, threaded through the sheave, and rearwardly extended therefrom and connected to the leg of the A frame opposite that on which the earthworking tool is mounted.

4. A cultivator comprising a substantially A-shaped frame having an apex, a pair of divergent legs rearwardly extended from the apex, one thereof being rigid and the other articulated for upward and downward angling, means for securing the articulated leg in predetermined adjustment, and a strut interconnecting the legs in fixed spaced relation; a swivel connection mounted at the apex of said A frame and adapted for connection to a draft appliance, swivel wheels mounted by the rearward end portions of the legs of the A frame and in supporting relation thereto; the swivel wheel mounted by the rigid leg being vertically adjustable in said leg for elevational control of said leg over earth traversed; an earthworking tool mounted in earth engagement by the rigid leg; a guide arm pivotally mounted in the frame and having a leg laterally extended to the side of the frame on which the earthworking tool is mounted and a second leg extended forwardly and sidewardly from the pivotal mounting of the guide arm to the side of the frame opposite the earthworking tool; a sheave adapted for connection to a draft appliance in substantial alignment with the second leg of the guide arm; and a flexible tension member threaded through the sheave, connected at one end to the second leg of the guide arm and at the other end to the articulated leg of the A frame.

5. A cultivator comprising a frame having forward and rearward end portions, means for swivelly connecting the forward end portion of the frame to a draft appliance, support wheels mounted in laterally spaced relation in the rearward end portion of the frame, a disc harrow blade rotatably mounted in the frame for earth engagement, said blade having an axis of rotation in fixed relation to the frame, a guide arm pivotally mounted in the frame forwardly of the blade and laterally extended from the frame, a sheave adapted for mounting on a draft appliance laterally spaced from the swivel connection of the frame thereto, and a flexible tension member passed through the sheave and connected to the guide arm and to the frame on opposite sides of the sheave.

HAROLD J. KANAWYER.
EARL F. HULTQUIST.

REFERENCES CITED

The following references are of record in the file of this patent:

UNITED STATES PATENTS

| Number | Name | Date |
|---|---|---|
| 218,173 | Harris | Aug. 5, 1879 |
| 836,214 | Reeve | Nov. 20, 1906 |
| 1,091,131 | Hanson | Mar. 24, 1914 |
| 1,316,183 | Pratt et al. | Sept. 16, 1919 |
| 1,888,502 | Holstein | Nov. 22, 1932 |
| 2,237,884 | Lysedahl | Apr. 8, 1941 |
| 2,442,095 | Reed et al. | May 25, 1948 |
| 2,489,633 | Fulgham | Nov. 29, 1949 |

FOREIGN PATENTS

| Number | Country | Date |
|---|---|---|
| 537,793 | France | Mar. 9, 1922 |